(12) United States Patent
Bernard et al.

(10) Patent No.: US 6,956,994 B2
(45) Date of Patent: Oct. 18, 2005

(54) METHOD FOR MANUFACTURING A FBG HAVING IMPROVED PERFORMANCES AND AN ANNEALING-TRIMMING APPARATUS FOR MAKING THE SAME

(75) Inventors: Pierre Bernard, Sainte-Foy (CA);
Nathalie Grégoire, Québec (CA);
Ghislain Lafrance,
St-Augustin-de-Desmaures (CA)

(73) Assignee: Teraxion Inc., Sainte-Foy (CA)

( * ) Notice: Subject to any disclaimer, the term of this patent is extended or adjusted under 35 U.S.C. 154(b) by 190 days.

(21) Appl. No.: 10/695,658

(22) Filed: Oct. 28, 2003

(65) Prior Publication Data

US 2004/0161195 A1 Aug. 19, 2004

(30) Foreign Application Priority Data

Feb. 14, 2003 (CA) .................................. 2418888

(51) Int. Cl.$^7$ ............................................... G02B 6/34
(52) U.S. Cl. ............................ 385/37; 359/34; 438/32
(58) Field of Search ............................ 385/37; 359/34; 438/32

(56) References Cited

U.S. PATENT DOCUMENTS

| | | | |
|---|---|---|---|
| 6,356,681 B1 * | 3/2002 | Chen et al. ................... | 385/37 |
| 6,819,834 B2 * | 11/2004 | Ishii et al. ..................... | 385/37 |
| 2003/0192174 A1 * | 10/2003 | Devegowda ................ | 29/825 |

OTHER PUBLICATIONS

M. Rochette, et al., "Gain Equalization of EDFAs with Bragg gratings", Phot. Tech. Lett. 11, (1999) pp. 536-538, no month.

S. Kannan, et al., "Thermal stability analysis of UV-induced fiber Bragg gratings", J. Light, Tech., 15 (1997), pp. 1478-1483, Aug. 1997.

Y.M. Xiao et al., "Thermal stress limitations to laser fire polishing of glasses", Appl. Opt. 22, (1983), pp. 2933-2936, Sep. 1983.

K. Egashira et al., "Analysis of thermal conditions in CO2 laser splicing of optical fibers", Appl. Opt. 16, (1977) pp. 2743-2746, Oct. 1977.

L. Drozin et al., "Long-period fibre gratings written by CO2 exposure of H2-loaded, standard fibres", Elect. Lett. 36, (2000) pp. 742-744, Apr. 2000.

* cited by examiner

Primary Examiner—Michelle R. Connelly-Cushwa
(74) Attorney, Agent, or Firm—Darby & Darby (57) ABSTRACT

A method for manufacturing a FBG having improved performances and an annealing-trimming apparatus for making the same are provided. The trimming and the annealing steps are advantageously combined into a single process in order to efficiently fabricate complex FBG filters with improved performance. The method comprises the steps of UV-writing a FBG in an optical fiber prior to annealing-trimming characteristics of the FBG by performing the sub-steps of monitoring characteristic data of the FBG while generating a controlled complex temperature profile along the FBG with a heating means according to the characteristic data for providing an accurate controlled annealing process of the FBG, thereby providing an accurate trimming thereof.

35 Claims, 7 Drawing Sheets

METHOD FOR MANUFACTURING A FBG HAVING IMPROVED PERFORMANCES AND AN ANNEALING-TRIMMING APPARATUS FOR MAKING THE SAME

FIELD OF THE INVENTION

The present invention generally relates to a method and an apparatus for manufacturing fiber Bragg gratings (FBGs) having improved performances. More particularly, the invention concerns a method and apparatus wherein the trimming of the FBG and the annealing thereof steps are combined in order to efficiently manufacture FBGs with improved performance.

BACKGROUND OF THE INVENTION

FBGs and chirped FBGs are widely used technologies to fabricate complex filters. Gain flattening filters for erbium doped fiber amplifiers (EDFAs) are but one example. Gain flatness of optical amplifiers over the communication bandwidth is a key requirement of high performance optical Wavelength Division Multiplexing (WDM) communication systems. Usually, a gain flattening filter with a spectral response matching the inverse gain profile is incorporated within the amplifier to flatten its gain.

Several gain flattening filter technologies can be used to perform the gain equalization, thin film filters and chirped FBGs being the most widely used, as described in "Gain equalization of EDFAs with Bragg gratings", Phot. Tech. Lett. 11, 536–538 (1999), M. Rochette, M. Guy, S. Larochelle, J. Lauzon, F. Trépanier. A key metric of performance for gain flattening filters is the insertion loss error function (ILEF): the difference between the measured attenuation of the filter and the target spectra. The target spectra is specific to each amplifier design and is closely related to the inverse gain curve. Because amplifiers are often cascaded along a link, the cumulative effect of the error function of the individual filters is also of importance. Individual filter ILEF smaller than or equal to ±0.1 dB for the full operating temperature and wavelength range of a system are often required, and the ILEF must be as random as possible to avoid the additive effect of systematic errors. In the case of thin film filters-gain flattening filter, the manufacturing process is such that all gain flattening filters have very similar error functions of the order of ±0.25 dB and these systematic errors can add up to unacceptable levels.

The chirped fiber Bragg grating is an attractive technology to produce very low error gain flattening filters. Although several manufacturing approaches are possible, gain flattening filters are typically inscribed in photosensitive fibers using UV light and a chirped phase mask to create an interfering pattern with linearly changing period along the grating. The amplitude of the resulting index modulation can also be shaped by controlling the intensity of the UV-light along the phase-mask. This shaping and trimming process at the UV-writing station is required to obtain low ILEF.

UV-induced defects are responsible for the grating formation but these defect sites are not thermodynamically stable and the change in refractive index can be reversed. This is why gratings are then subjected to a stabilization process, which is a controlled temperature anneal. This annealing progressively removes the most unstable defect sites and the final grating is stable within the system tolerances for the intended grating lifetime. Of course, the annealing step reduces the refractive index modulation and consequently, the grating must be written stronger in order to hit the post-annealing target. This manufacturing process is quite adequate for ILEF of the order of ±0.25 dB. However, imperfections in the phase mask, mechanical and laser instabilities make it very difficult to obtain ILEF smaller than ±0.15 dB. In those cases, a lengthy manual UV-trimming process is often required. Even then, the subsequent temperature annealing process can slightly distort the final spectral shape and the resulting production yield is low. Finally, because the UV-trimming process is operator dependent, it often leads to small but noticeable systematic errors in the ILEF. Very similar process steps apply to other types of complex filters based on FBGs and chirped FBGs. In those cases, the metric can be something other than the ILEF but the general method and apparatus of the present invention which will be described thereinafter would apply equally.

OBJECTS AND SUMMARY OF THE INVENTION

It is therefore an object of the present invention to provide a method and apparatus allowing a more precise tailoring of the characteristic spectra of a FBG than for prior art manufacturing techniques, thereby providing a FBG having improved performances.

In accordance with an aspect of the present invention, the trimming and annealing steps are combined into a single process in order to efficiently fabricate complex FBG filters with improved performance.

Accordingly, there is provided a method for manufacturing a FBG having improved performances, the method comprising the steps of:
 a) UV-writing a FBG in an optical fiber;
 b) annealing-trimming characteristics of the FBG by performing the sub-steps of:
  i) monitoring characteristic data of the FBG; and
  ii) generating a controlled complex temperature profile along the FBG with a heating means according to the characteristic data for providing an accurate controlled annealing process of the FBG, thereby providing an accurate trimming thereof.

In a preferred embodiment of this method, the sub-step i) comprises the sub-step of monitoring a slope factor $s(\lambda)$ and a demarcation energy $E_d(T, t)$ of the FBG. Moreover, in the sub-step ii), the complex temperature profile is time-controlled according to the slope factor $s(\lambda)$ and the demarcation energy $E_d(T, t)$ until the FBG reaches targeted spectral characteristics.

In another preferred embodiment of this method, the FBG is a gain flattening filter having a spectral response matching an inverse gain profile of an amplifier within the gain flattening filter is incorporated for flattening a gain of the amplifier. Preferably, the gain flattening filter has an improved insertion loss error function which is advantageously smaller than +/−0.15 dB.

According to another aspect of the present invention, there is provided an annealing-trimming apparatus for manufacturing a FBG having improved performances. The annealing-trimming apparatus is provided with an analysing means operatively connected to a UV-written FBG provided in an optical fiber for monitoring characteristic data of the FBG. The annealing-trimming apparatus is also provided with a processing means operatively connected to the analysing means for processing the characteristic data. The annealing-trimming apparatus is also provided with a heating means operatively connected to the processing means for generating a controlled complex temperature profile along the FBG according to the characteristic data, thereby providing an accurate annealing-trimming of the FBG.

In a preferred embodiment of the annealing-trimming apparatus, the analysing means is provided with a light source for launching a light beam into the UV-written FBG, and an optical spectral analyser for analysing the light beam exiting from the UV-written FBG, thereby providing characteristic data. The heating means is provided with a heat source, advantageously a laser, for allowing an annealing of the UV-written FBG. The heating means is also provided with a X-Y scanner operatively connected to each of the processing means and heat source. The X-Y scanner is controlled by the processing means according to characteristic data for scanning the heat source along said FBG, thereby applying the complex temperature profile along the FBG.

Advantageously, the present invention makes possible the creation of any desired temperature profile along the length of the FBG. It allows to precisely locate the FBG in space, and to affect local correction to the FBG spectral curve without affecting nearby points. The method and apparatus of the present invention also make it possible to estimate the necessary time and temperature to affect the required correction and end-of-life performance of the FBG after final processing, and estimate and take into account cladding mode losses of the FBG. Systematic errors between the final spectral curve and the target curve on a cascaded series of FBGs are advantageously reduced.

BRIEF DESCRIPTION OF THE DRAWINGS

These and other objects and advantages of the present invention will become apparent upon reading the detailed description and upon referring to the drawings in which:

FIG. 2b is a graph illustrating two different master curves at two different given wavelengths of the CFBG-GFF of FIG. 2a.

FIG. 2c is a graph illustrating the slope spectra s($\lambda$) measured along the length of the CFBG-GFF of FIG. 2a.

FIG. 7b is a graphical representation of the residual error (lower trace) along with the isolated higher-frequency noise of the initial spectra (upper trace) of the GFF of FIG. 7a.

While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DESCRIPTION OF PREFERRED EMBODIMENTS OF THE INVENTION

In the following description, similar features in the drawings have been given similar reference numerals and in order to weight down the figures, some elements are not referred to in some figures if they were already identified in a preceding figure.

This invention relates in particular to a method and apparatus to quickly modify the spectral response curve of FBG filters in order to precisely match a pre-defined target spectra, most often but not exclusively the inverse gain profile of an Er doped fiber amplifier (EDFA). The invention provides a method and apparatus to create any desired temperature profile along the length of the FBG; a mean to precisely locate the FBG in space; a mean to affect local correction to the FBG spectral curve without affecting nearby points; a mean to estimate the necessary time and temperature to affect the required correction; a mean to estimate end-of-life performance of the FBG after final processing; a mean to reduce systematic errors between the final spectral curve and the target curve on a cascaded series of FBGs; and a mean to estimate and take into account cladding mode losses of the FBG.

More particularly, the present invention concerns a method and apparatus where the requirements at the UV-writing station are considerably relaxed when compared to prior art techniques. No UV-trimming is necessary and it is sufficient, in the case of gain flattening filters, that the FBG attenuation curve be everywhere superior to the target attenuation curve, with provision for the annealing step. Then, instead of a uniform annealing, the next step involves a controlled annealing along the grating length in order to precisely match the target spectra. This requires both a good understanding of the ageing/annealing process along the FBG and a mean to precisely control it, as it will be discussed in more details thereinafter. In the particular case of gain flattening filters, this controlled annealing step leads to filters with very low insertion loss error function (ILEF). In a preferred embodiment of the method of the present invention, the ILEF can be smaller than +/−0.15 dB. Throughout the present description, it is often referred to gain flattening filters but it should be understood that the present invention could also equally be applied to any type of FBG, including linearly or not chirped FBGs. For the case of gain flattening filters, the metric is advantageously the ILEF but it is to be noticed that for the general case, the metric can be something other than the ILEF.

Thus, the present invention provides a method for manufacturing a FBG comprising the steps of:
a) UV-writing a FBG in an optical fiber;
b) annealing-trimming characteristics of the FBG by performing the sub-steps of:
  i) monitoring characteristic data of the FBG; and
  ii) generating a controlled complex temperature profile along the FBG with a heating means according to the characteristic data for providing an accurate controlled annealing process of the FBG, thereby providing an accurate trimming thereof.

In order to easily implement the present method, the present invention also provides an apparatus for manufacturing a FBG having improved performance.

Figure 4:
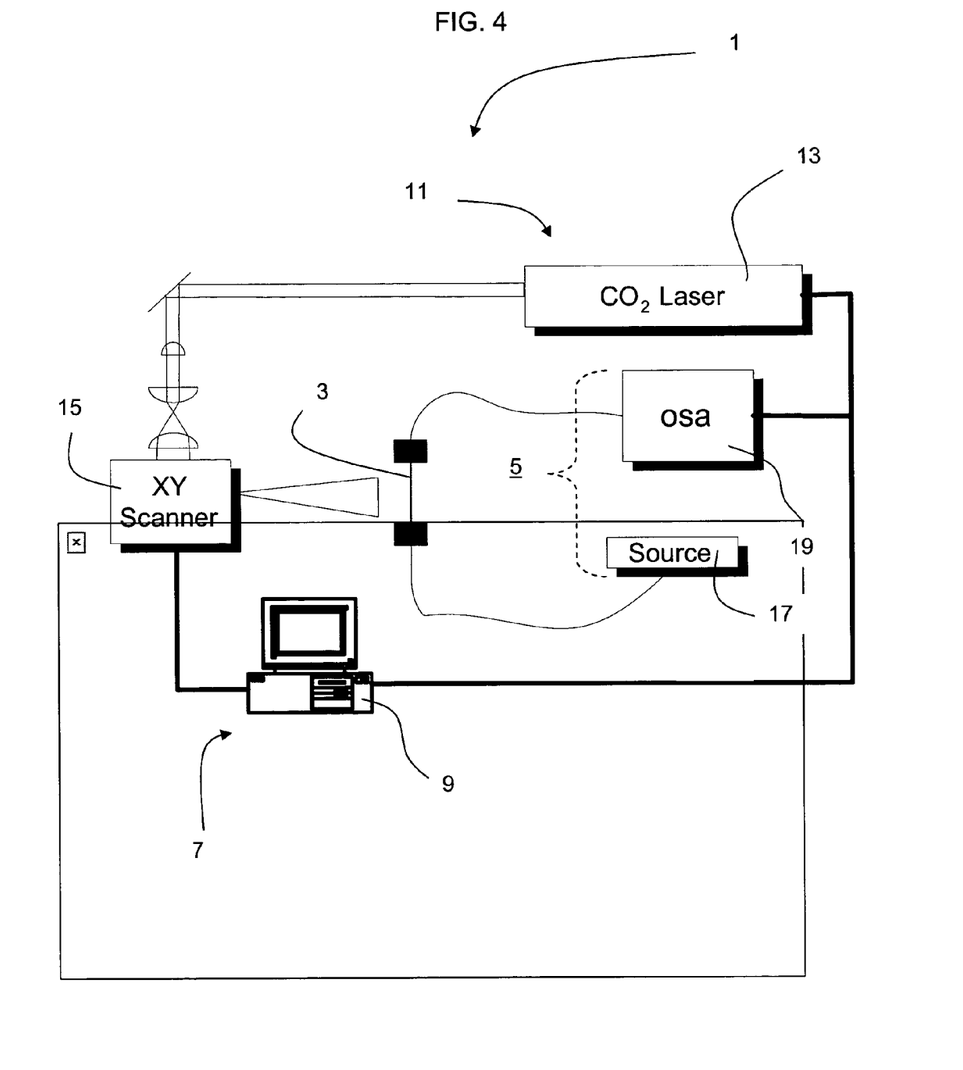
FIG. 4 is a schematic diagram of an annealing-trimming apparatus according to a preferred embodiment of the present invention.

Accordingly, with reference to FIG. 4, there is provided an annealing-trimming apparatus 1 for manufacturing a FBG having improved performances. The annealing-trimming apparatus 1 is provided with an analysing means 5 operatively connected to a UV-written FBG 3 provided in an optical fiber for monitoring characteristic data of the FBG 3. The annealing-trimming apparatus 1 is also provided with a processing means 7 operatively connected to the analysing means 5 for processing the characteristic data. The processing means 7 can advantageously be a computer 9 but any convenient means for processing the data could also be envisaged. The annealing-trimming apparatus 1 is also provided with a heating means 11 operatively connected to the processing 7 means for generating a controlled complex temperature profile along the FBG 3 according to the characteristic data, thereby providing an accurate annealing-trimming of the FBG 3.

Figure 1:
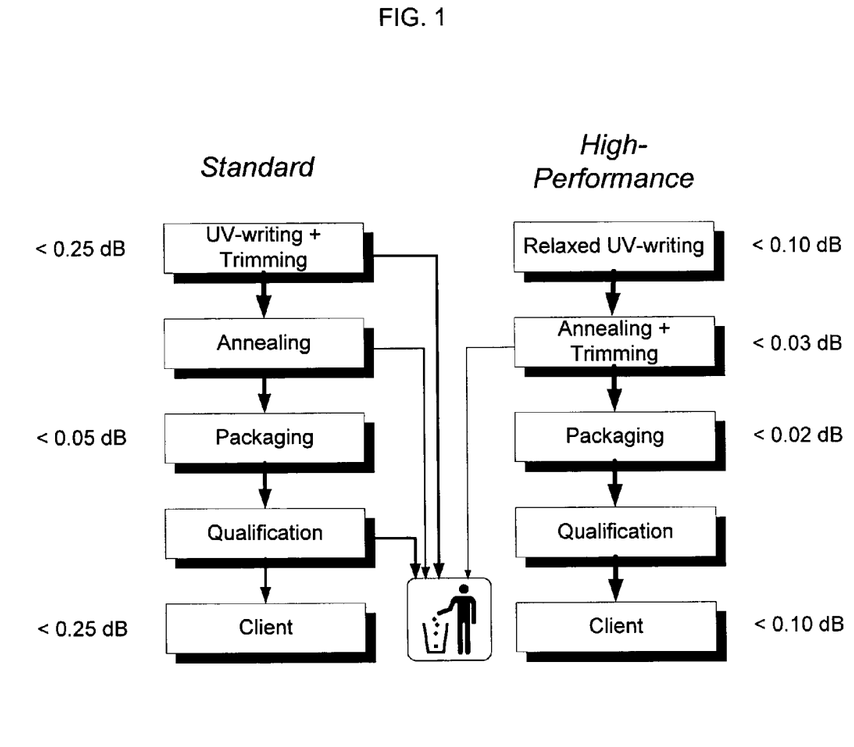
FIG. 1 illustrates the manufacturing steps for the standard GFFs (PRIOR ART) and high-performance GFFs according to a preferred embodiment of the present invention.

FIG. 1 illustrates the general process steps and error sources for both standard GFFs (prior art) and high-performance GFFs. Outer columns point to main error sources while inner columns illustrate yield losses. For the standard product of the prior art, trimming of the error function is accomplished at the UV-writing station. The error function will thus have a higher-frequency (period <2 nm) random noise component typical of chirped FBGs (CFBGs) and a low-frequency systematic error component caused by the trimming process. The annealing step is necessary to insure long term reliability and is relatively simple, fast and introduces minimal errors. Finally, the packaging step can also be a source of both systematic (residual thermal drift) and random errors (repeatability of the central wavelength adjustment). According to the prior art, yield losses are most important at the UV-writing and the final qualification stations. Of course, losses at qualification step are the most costly and an important goal of the present invention was to eliminate those losses.

For the high-performance GFF, the UV-writing station only targets a rough outline of the filter curve. This step is thus quick and very efficient and only introduces the higher-frequency noise component in the error function. This residual random noise is a function of the grating strength but can usually be kept below 0.1 dB pk-pk if necessary. Next in-line is the annealing-trimming process of the present invention. It is advantageously highly automated, fast and does all the necessary measurements so that parts moving through packaging are all but guaranteed to past qualification. It also provides services unavailable before: reduction of systematic errors on a part-by part or batch processing, feedback to the UV-writing station, and long term reliability measurement for each part, as will be explained in more details thereinafter.

As explained above, applying the required controlled annealing along the grating length requires a good understanding of the ageing/annealing process along the FBG and a means to precisely control it.

The ageing curve or master curve approach to decay analysis has proven to be a useful model to understand and predict the change in refractive index modulation ($\Delta n$) versus time and temperature, as disclosed in "Thermal stability analysis of UV-induced fiber Bragg gratings" S. Kannan, J. Z. Y. Guo, P. J. Lemaire, J. Light. Tech., 15, 1478–1483 (1997). In this model, the change in refractive index modulation is a function of the ageing parameter, or equivalently the demarcation energy $E_d$:

$$(\Delta n)_{final}=(\Delta n)_{initial}+s(E_d^{final}-E_d^{initial}) \qquad (1)$$

where s is the slope parameter related to the defects energy distribution and $E_d$ is a function of temperature (T) and time (t):

$$E_d=k_{Boltzman} \cdot T \ln(v_0 t) \qquad (2)$$

where $v_0$ is the frequency factor, a constant for a given fiber type and UV-writing process. This model was extended to the case where the slope factor s can change along the grating, or equivalently, as a function of the wavelength in the filter spectra ($s(\lambda)$) of a chirped FBG. The validity of this assumption is supported by its success in predicting the change in refractive index modulation with temperature and time.

Thus, in a preferred embodiment of the method of the present invention, the sub-step i) comprises the sub-step of monitoring a slope factor $s(\lambda)$ and a demarcation energy $E_d$ (T, t) of the FBG. Moreover, in the sub-step ii), the complex temperature profile is time-controlled according to the slope factor $s(\lambda)$ and the demarcation energy $E_d$ (T, t) until the FBG reaches targeted spectral characteristics.

Figure 2A:
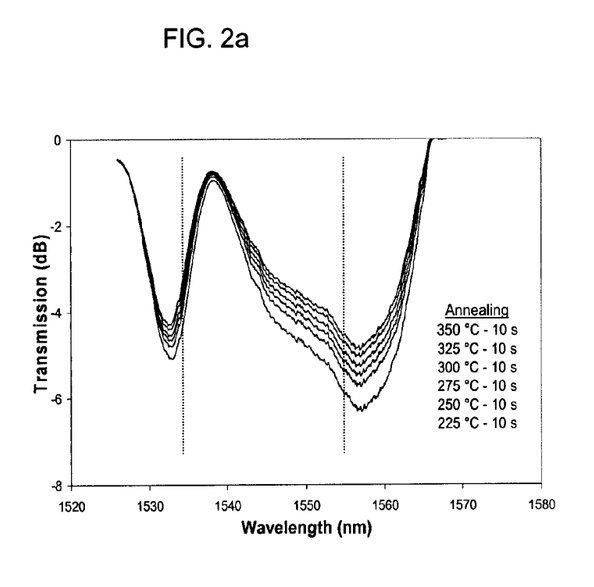
FIG. 2a is a graph representing isochronal annealing curves for a typical CFBG-GFF according to a preferred embodiment of the present invention.
Figure 2B:
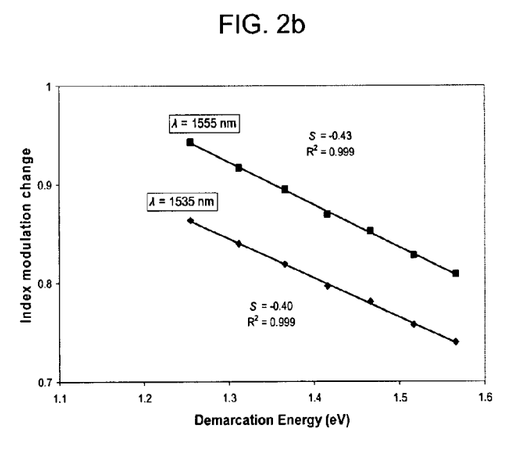
Figure 2C:
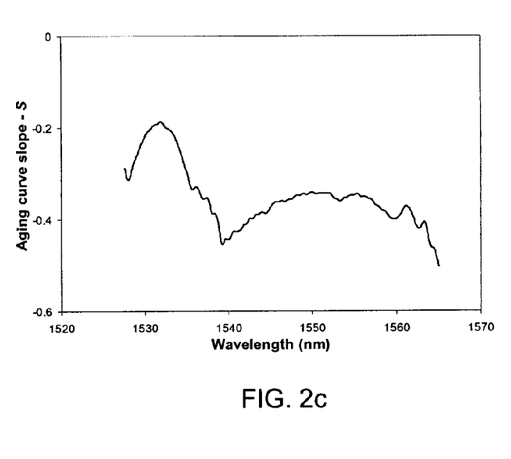

Advantageously, the controlled annealing process comprises a series of isochronal annealing steps of increasing temperature, as illustrated in FIG. 2a showing how it is applied to a specific gain flattening filter. FIG. 2b shows the master curve for a specific wavelength (vertical line in FIG. 2a). The results fit very well with equation 1. In practice, the calculated slope can vary along the length of the grating. FIG. 2c shows a slope spectra $s(\lambda)$ measured along the length of the grating. Once $s(\lambda)$ is known, it is possible to calculate the required annealing conditions that will reduce the refractive index modulation by a given amount. In this fashion, the transmission spectra can be matched to any lower-loss target. In FIGS. 2a through 2c, a particular range of wavelength is shown but it should be understood that any convenient range of wavelength could also be used for a specific application.

Trimming the gain flattening filter spectral curve in this fashion requires a well controlled heat source. Accordingly, referring again to FIG. 4, in a preferred embodiment of the present invention, the heating means 11 of the annealing-trimming apparatus 1 is provided with a heat source 13, advantageously a laser, and more advantageously a $CO_2$ laser, for allowing an annealing of the UV-written FBG 3. The heating means 11 is also provided with a X-Y scanner 15 operatively connected to each of the processing means 7 and heat source 13. The X-Y scanner 15 is controlled by the processing means 7 according to characteristic data for scanning the heat source 13 along the FBG, thereby applying the complex temperature profile along the FBG. In other words, the heat source 13 is constantly scanned, advantageously at high speed, along the FBG 3 for providing a position-modulated heating of the FBG, thereby generating the complex temperature profile along the FBG. The $CO_2$ laser is a particularly well adapted heat source for silica glass in general and optical fibers in particular. The coefficient of absorption of 10 $\mu$m radiation is so high for silica that most of the power is absorbed within the first 10–20 $\mu$m thick layer. Also, silica can tolerate very rapid heating and cooling cycles because its coefficient of thermal expansion is so low, as disclosed in "Thermal stress limitations to laser fire polishing of glasses", Y. M. Xiao and Michael Bass, Appl. Opt., 22, 2933–2936 (1983). Fiber optic splicing or cleaving and the fabrication of long period gratings are just a few examples of the many uses of $CO_2$ lasers in this field. See for example "Analysis of thermal conditions in $CO_2$ laser splicing of optical fibers", K. Egashira, M. Kobayashi, Appl. Opt., 16, 2743–2746 (1977), and "Long-period fibre gratings written by $CO_2$ exposure of $H_2$-loaded, standard fibres", L. Drozin, P.-Y. Fonjallaz, L. Stensland, Elect. Lett., 36, 742–744 (2000). The lasers themselves are cheap, robust and require very little maintenance.

Figure 3:
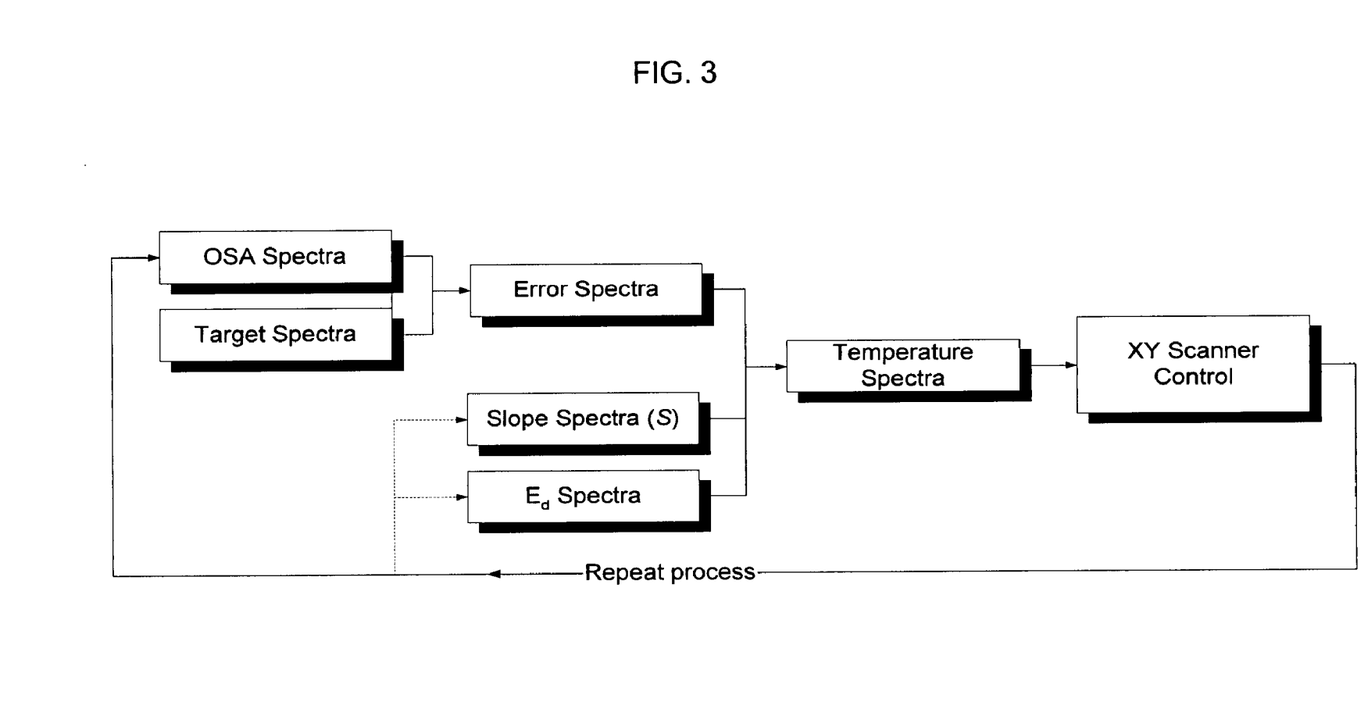
FIG. 3 is a flow chart of an algorithm used in correcting a gain flattening filter according to a preferred embodiment of the present invention.

Assuming then that the temperature profile along the grating can be controlled, FIG. 3 outlines the general annealing-trimming process. The $s(\lambda)$ and $E_d$ spectra are added to the error spectra to calculate the required temperature profile, assuming a fix length heating cycle. The process is repeated until the required tolerances on the error function is reached. Advantageously, an initial calibration phase (not shown) can be performed for calculating initial values of $s(\lambda)$ and $E_d$ (T, t). This calibration may be obtain in performing a first and a second temperature anneals, preferably rapid uniform anneals.

Still referring to FIG. 4, which is a schematic of a preferred embodiment of an annealing-trimming apparatus of the present invention, all components and measurements are computer controlled. In this particular preferred embodiment, the analysing means 5 of the annealing-trimming apparatus 1 is provided with a light source 17 for launching a light beam into the UV-written FBG 3. The analysing means 5 is also provided with an optical spectral analyser (OSA) 19 for analysing the light beam exiting from the UV-written FBG 3, thereby providing characteristic data. An important hardware component for this particular system is the XY-scanner 15 which allows fast and precise positioning of the laser beam along the FBG 3. During the annealing-trimming steps, the laser beam is constantly scanned at high speed along the chirped FBG. The required precise temperature profile is obtained through a position-modulated technique which essentially controls the laser fluence along the grating by locally varying the scan speed. Alternately, the scan speed could be fixed and the laser fluence could be modified as a function of its position along the grating. Another possibility is to have the scan speed and laser fluence fixed and to add a rapid oscillating movement of the laser beam in the axis perpendicular to the fiber axis. Adjusting the amplitude of this perpendicular oscillation as the beam moves along the fiber would also have the same effect as varying the local laser fluence.

Of course, any other convenient heating means allowing to apply the required complex temperature profile along the length of the FBG could also be envisaged. For example, in another preferred embodiment which is not illustrated, the heating means may be provided with a heating wire extending along the FBG. In another preferred embodiment which is not illustrated, the heating means is provided with a plurality of controllable heating devices distributed in close proximity along the FBG. Each of the heating devices is independently controlled by the processing means for generating the complex temperature profile along the FBG. One can also imagine to use a heated air jet mechanically scanned along the length of the FBG for applying the required complex temperature profile to the FBG.

Each new FBG filter to be processed is roughly positioned in place by the operator and connected to the optical spectrum analyser (OSA). A low-temperature heat-scan technique is then used to automatically calibrate the position of the grating. A similar technique can be used to estimate the grating strength and thus cladding mode losses along the chirped FBG.

In short, the software does all data processing and commands a temperature profile, and the hardware provides the mean to create the temperature profile along the FBG. Of course, in practice, in order to achieve repeatable and precise trimming, the algorithm must take into account many other factors such as: cladding mode losses, frequency response of the scanner, finite laser beam width and fiber thermal response. Nevertheless, because of the multi-step approach and the self-adapting algorithm, the process is very robust.

Figure 5:
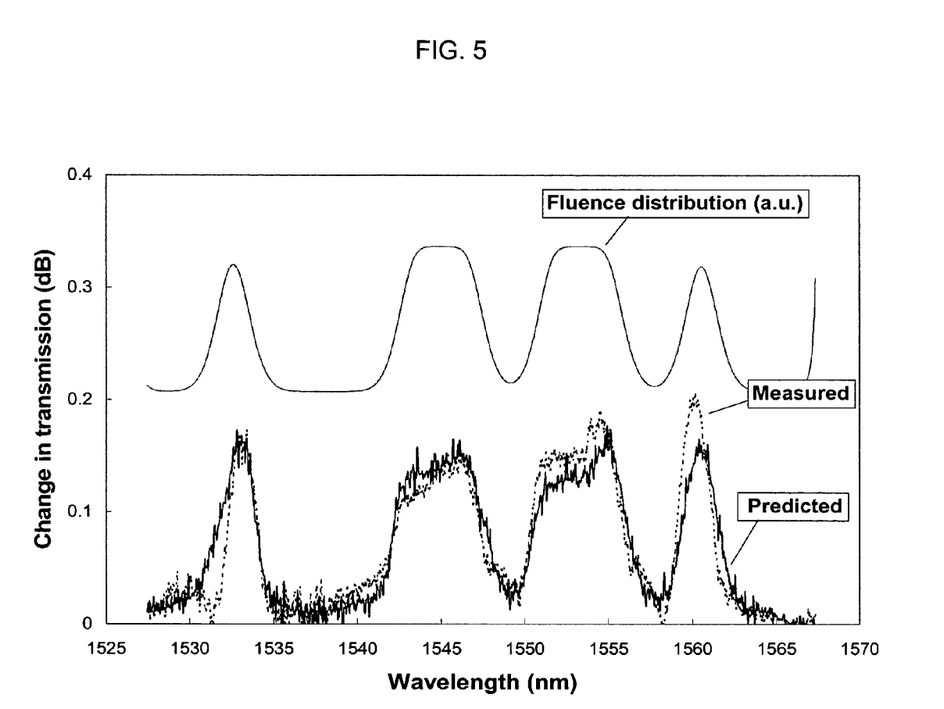
FIG. 5 the upper graph is a graph illustrating an applied laser fluence (temperature) profile applied to a CFBG-GFF according to a preferred embodiment of the present invention; the lower graph is a graph illustrating measured and predicted changes in the GFF transmission spectra according to the applied laser fluence profile illustrated in the upper graph.

FIG. 5 illustrates a specific example of the results obtainable with the present invention. In this case, a chirped FBG gain flattening filter was submitted to an arbitrary temperature profile to simulate corrections in 4 distinct zones. Learning from previous annealing steps, the software was able to accurately predict the resulting change in the gain flattening filter spectra; even smaller details like the tail of rightmost zone and the overlap of the two middle zones were correctly calculated.

Figure 6:
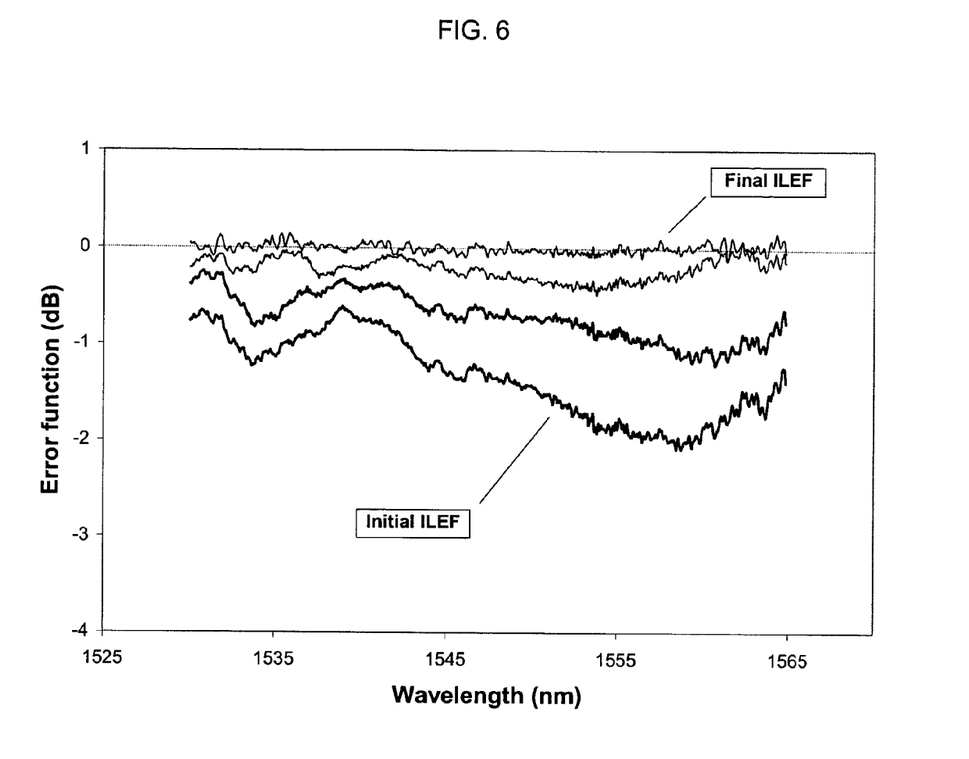
FIG. 6 is a graph illustrating an evolution of an error function from start (bottom trace) to finish (top trace), according to a preferred embodiment of the present invention.

The following example illustrates the overall process applied to the fabrication of a gain flattening filter. FIG. 6 shows the evolution of the error function from the moment the gain flattening filter arrived at the station and for several of the 10 seconds trimming scans. In this particular case, the initial error is unusually large because the gain flattening filter was intentionally overwritten to illustrate the capability of the process. Theoretically, the trimming could be accomplished in a single step. However, because over-trimming is difficult to correct, a multi-step approach is preferred.

Figure 7A:
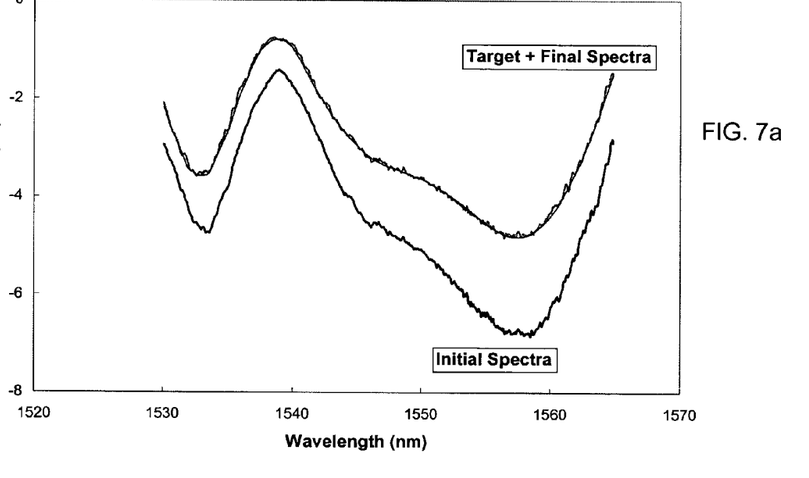
FIG. 7a is a graphical representation of an initial GFF spectra and a corresponding final spectra along with a target, according to a preferred embodiment of the present invention.
Figure 7B:
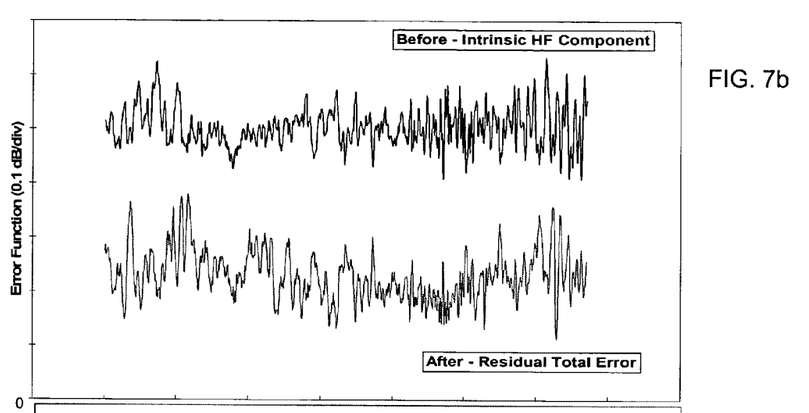

FIG. 7a illustrates the final results, showing the initial gain flattening filter, the target and final curve. FIG. 7b shows the residual error function along with the high-frequency component of the gain flattening filter spectra just after UV-writing. The final error function is approximately ±0.1 dB, almost totally limited by the original high-frequency component. In this case, the target error function was ±0.15 dB.

In some special cases, reaching the required target in a specific region along the chirped FBG could lead to over-correction to nearby regions because of heat diffusion. These regions can be automatically detected by the software and corrected by using a very fast on-off scanning process that limits heat diffusion.

Some additional features are relatively easy to implement. For example, the station can be instructed to not only consider the error function of the FBG filter being process but all other previous error functions of the same series. This type of batch processing can further reduce the overall systematic error of cascaded gain flattening filters. It can also be envisioned that a single profile at the UV-writing station could fit many end-profiles, thereby simplifying the manufacturing process. Furthermore, it is not impossible to consider that with a modified package, the final GFF profile could be trimmed "in place" in-facto correcting for all other amplifier errors and leading to very low-error amplifier module.

The preferred embodiments described here pertain more specifically to chirped FBG gain flattening filters but the main technique and apparatus could also be applied to other complex FBG filters.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A method for manufacturing a FBG having improved performances, said method comprising the steps of:
   a) UV-writing a FBG in an optical fiber;
   b) annealing-trimming characteristics of said FBG by performing the sub-steps of:
      i) monitoring characteristic data of said FBG; and
      ii) generating a controlled non-uniform complex temperature profile along the FBG with a heating means according to said characteristic data for providing an accurate controlled annealing process of the FBG, thereby providing an accurate trimming thereof.

2. The method for manufacturing a FBG having improved performances according to claim 1, wherein said sub-step i) comprises the sub-step of:
   monitoring a slope factor $s(\lambda)$ and a demarcation energy $E_d$ (T, t) of said FBG; and
wherein, in said sub-step ii), said complex temperature profile is time-controlled according to said slope factor $s(\lambda)$ and said demarcation energy $E_d$ (T, t) until said FBG reaches targeted spectral characteristics.

3. The method for manufacturing a FBG having improved performances according to claim 2, wherein said step b) comprises an initial calibration phase sub-step of performing a first and a second temperature anneal for calculating initial values of $s(\lambda)$ and $E_d$ (T, t).

4. The method for manufacturing a FBG having improved performances according to claim 1, wherein said controlled annealing process comprises a series of isochronal annealing steps of increasing temperature.

5. The method for manufacturing a FBG having improved performances according to claim 1, wherein said heating means comprises a heat source constantly scanned at a high speed along said FBG for providing a position-modulated heating of said FBG, thereby generating said complex temperature profile along said FBG.

6. The method for manufacturing a FBG having improved performances according to claim 5, wherein said heat source is a laser beam.

7. The method for manufacturing a FBG having improved performances according to claim 6, wherein a fluence of said laser beam is adjusted along said FBG by locally controlling a scan speed of said laser beam.

8. The method for manufacturing a FBG having improved performances according to claim 5, wherein said heat source is scanned along said FBG with ON/OFF periods for limiting heat diffusion, thereby preventing an over-correction generated by said heat diffusion.

9. The method for manufacturing a FBG having improved performances according to claim 5, wherein said step b) comprises a position-calibration sub-step of performing a low temperature heat scan along said FBG for calibrating a position thereof.

10. The method for manufacturing a FBG having improved performances according to claim 5, wherein said step b) comprises an initial sub-step of performing a low temperature heat scan along said FBG for providing an estimation of cladding mode losses along said FBG.

11. The method for manufacturing a FBG having improved performances according to claim 5, wherein said heat source is a heated air jet mechanically scanned along said FBG.

12. The method for manufacturing a FBG having improved performances according to claim 1, wherein said heating means comprises a laser beam constantly scanned at a fixed speed along said FBG, a fluence of said laser beam being adjusted as a function of a position of said laser beam along said FBG, thereby providing said complex temperature profile along said FBG.

13. The method for manufacturing a FBG having improved performances according to claim 1, wherein said heating means comprises a laser beam constantly scanned at a fixed speed along said FBG, said laser beam being oscillated perpendicularly to a longitudinal axis of said FBG with a controlled amplitude for providing said complex temperature profile along said FBG.

14. The method for manufacturing a FBG having improved performances according to claim 1, wherein said FBG is a chirped FBG.

15. The method for manufacturing a FBG having improved performances according to claim 1, wherein said FBG is a complex filter.

16. The method for manufacturing a FBG having improved performances according to claim 1, wherein said FBG is a gain flattening filter.

17. The method for manufacturing a FBG having improved performances according to claim 16, wherein said gain flattening filter has a spectral response matching an inverse gain profile of an amplifier for flattening a gain of said amplifier.

18. The method for manufacturing a FBG having improved performances according to claim 16, wherein said gain flattening filter has an improved insertion loss error function.

19. The method for manufacturing a FBG having improved performances according to claim 18, wherein said insertion loss error function is smaller than +/−0.15 dB.

20. The method for manufacturing a FBG having improved performances according to claim 1, wherein said FBG is UV-written with provision for the annealing-trimming step to reach a post annealing target.

21. An annealing-trimming apparatus for manufacturing a FBG having improved performances, said apparatus comprising:
   an analysing means operatively connected to a UV-written FBG provided in an optical fiber for monitoring characteristic data of said FBG;
   a processing means operatively connected to said analysing means for processing said characteristic data;
   a heating means operatively connected to said processing means for generating a controlled non-uniform complex temperature profile along said FBG according to said characteristic data, thereby providing an accurate annealing-trimming of said FBG.

22. The annealing-trimming apparatus for manufacturing a FBG according to claim 21, wherein said analysing means comprises:
   a light source for launching a light beam into said UV-written FBG; and
   an optical spectral analyser for analysing the light beam exiting from said UV-written FBG, thereby providing characteristic data.

23. The annealing-trimming apparatus for manufacturing a FBG according to claim 21, wherein said heating means comprises a heating wire extending along said FBG.

24. The annealing-trimming apparatus for manufacturing a FBG according to claim 21, wherein said heating means comprises a plurality of controllable heating devices distributed in close proximity along said FBG, each of said heating devices being independently controlled by said processing means for generating said complex temperature profile along said FBG.

25. The annealing-trimming apparatus for manufacturing a FBG according to claim 21, wherein said heating means comprises a heated air jet mechanically scanned along said FBG.

26. The annealing-trimming apparatus for manufacturing a FBG according to claim 21, wherein said heating means comprises:
   a heat source for allowing an annealing of said UV-written FBG; and
   a X-Y scanner operatively connected to each of said processing means and heat source, said X-Y scanner being controlled by said processing means according to characteristic data for scanning said heat source along said FBG, thereby applying said complex temperature profile along said FBG.

27. The annealing-trimming apparatus for manufacturing a FBG according to claim 26, wherein said heat source is a laser.

28. The annealing-trimming apparatus for manufacturing a FBG according to claim 27, wherein said laser is a CO2 laser.

29. The annealing-trimming apparatus for manufacturing a FBG according to claim 21, wherein said processing means is a computer.

30. The annealing-trimming apparatus for manufacturing a FBG according to claim 21, wherein said FBG is a chirped FBG.

31. The annealing-trimming apparatus for manufacturing a FBG according to claim 21, wherein said FBG is a complex filter.

32. The annealing-trimming apparatus for manufacturing a FBG according to claim 21, wherein said FBG is a gain flattening filter.

33. The annealing-trimming apparatus for manufacturing a FBG according to claim 32, wherein said gain flattening filter has a spectral response matching an inverse gain profile of an amplifier for flattening a gain of said amplifier.

34. The annealing-trimming apparatus for manufacturing a FBG according to claim 32, wherein said gain flattening filter has an improved insertion loss error function.

35. The annealing-trimming apparatus for manufacturing a FBG according to claim 34, wherein said insertion loss error function is smaller than +/−0.15 dB.

* * * * *